United States Patent [19]
Takeda

[11] Patent Number: 5,827,973
[45] Date of Patent: *Oct. 27, 1998

[54] EQUIPMENT FOR ATTACHING A PART ON A SUBSTRATE

[75] Inventor: Goro Takeda, Kyoto, Japan

[73] Assignee: Cateye Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 617,660

[22] Filed: Mar. 18, 1996

[30] Foreign Application Priority Data

Mar. 20, 1995 [JP] Japan .................................. 7-060540

[51] Int. Cl.⁶ ........................................................ G01L 7/00
[52] U.S. Cl. ............................................... 73/756; 73/384
[58] Field of Search .............................. 73/756, 384, 386, 73/387

[56] References Cited

U.S. PATENT DOCUMENTS

| | | |
|---|---|---|
| 4,379,279 | 4/1983 | Nasiri . |
| 4,866,989 | 9/1989 | Lawless ..................................... 73/756 |
| 5,317,921 | 6/1994 | Kremidas .................................. 73/721 |
| 5,341,684 | 8/1994 | Adams et al. . |

FOREIGN PATENT DOCUMENTS

| | | |
|---|---|---|
| 0 497 534 A2 | 5/1992 | European Pat. Off. . |
| WO 93/11414 | 10/1993 | European Pat. Off. . |

*Primary Examiner*—Joseph L. Felber
*Attorney, Agent, or Firm*—Olson & Hierl, Ltd.

[57] ABSTRACT

A pressure sensor is gripped between attachment parts, and electrically connected to a substrate by means of a flat cable. A leg portion which is a part of attachment part is inserted to a receiving hole provided at the substrate. The diameter of the receiving hole is made larger than the diameter of the leg portion, and hence before a cover is attached, a pressure sensor is swingable within a hole of a panel. When the cover is brought into pressure contact with a pressure sensor set, the pressure sensor set is gripped between cover and substrate, and swinging thereof is inhibited.

8 Claims, 10 Drawing Sheets

EQUIPMENT FOR ATTACHING A PART ON A SUBSTRATE

BACKGROUND OF THE INVENTION

1. Field of the Invention

The present invention relates to a part attaching equipment and, more specifically to a part attaching equipment for attaching a functional element such as a pressure sensor to a substrate.

2. Description of the Related Art

FIG. 14 is an exploded perspective view showing how a pressure sensor is attached in accordance with a conventional technique and FIG. 15 is a cross section taken along the line X—X showing a state in which all the parts shown in FIG. 14 are engaged.

Referring to the figures, a pressure sensor 1 is fixed on a substrate 29 directly by soldering, on one surface. On the other surface, it is in pressure contact with a cover 35 with a sealing member 41 and a sponge 39 inserted in a hollow portion of sealing member 41 interposed. Cover 35 is provided with a recessed portion 37 in which the sealing member 41 is fitted. An air inlet 43 communicating the front and rear surfaces of cover 35 is provided at the bottom portion of the recessed portion 37.

When all the parts engaged, air inlet 43, the hollow portion of sealing member 41 in which sponge 39 is fitted, a sensing hole 45 and the inner side of pressure sensor 1 are connected as shown in FIG. 15, and because of the air introduced through air inlet 43, the pressure in the hollow portion of sealing member 41 in which sponge 39 is fitted and the pressure in pressure sensor 1 through sensing hole 45 become equal to the ambient pressure. Therefore, measurement of accurate pressure by pressure sensor 1 is possible.

Further, the air introduced through air inlet 43 does not leak from the hollow portion of sealing member 41, as it is sealed. Therefore, water or the like introduced with the air can be prevented from being brought into contact with substrate 29.

However, the conventional method of attaching a sensor has the following problems. (1) In order to establish connection between air inlet 43, the hollow portion of the sealing member, sensing hole 45 and the inside of pressure sensor 1, it is necessary to align the position of the recessed portion 37 of cover 35 with the horizontal position of pressure sensor 1 attached to the substrate 29. However, this position adjustment is difficult. Further, when there is caused a slight gap between cover 35 and substrate 29 by some shock, for example, as shown in FIG. 16, the state of pressure contact between pressure sensor 1 and cover 35 with sealing member 41 interposed is released. At this time, the ambient air introduced through air inlet 43 enters the inside of the equipment through the gap between sealing member 41 and pressure sensor 1, possibly causing malfunction of the equipment. (2) The pressure sensor is weak against shock. However, according to the conventional method of attachment, pressure sensor 1 is fixed on substrate 29. Therefore, shock applied to substrate 29 during the assembly of the equipment, for example, is directly transmitted to pressure sensor 1, which may cause damage to the pressure sensor.

SUMMARY OF THE INVENTION

The present invention was made to solve the above described problems and an object is to provide an equipment allowing attachment of a part easily at a desired position.

Another object of the present invention is to provide an attaching equipment which can reduce damage to a part caused by vibration.

According to the present invention, an equipment for attaching an attachment part to a first object of attachment such that the attachment part having a functional element can be fitted in a recessed portion of a second object of attachment includes a first unit electrically connecting the attachment part and the first object of attachment, a second unit for connecting the attachment part and the first object of attachment to be relatively movable with each other, and a third unit restricting a range of movement of the attachment part and the first object of attachment.

According to another aspect, a pressure sensor connected to a substrate includes a measuring portion for measuring pressure, a lead electrically connecting the measuring portion and a substrate, and a unit for changing the position of the measuring portion within a prescribed range.

Therefore, according to the present invention, the attachment part is attached to be movable within a prescribed range. This facilitates position adjustment of the attachment part. Further, shock applied to the attachment part can be reduced and hence damage to the attachment part can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
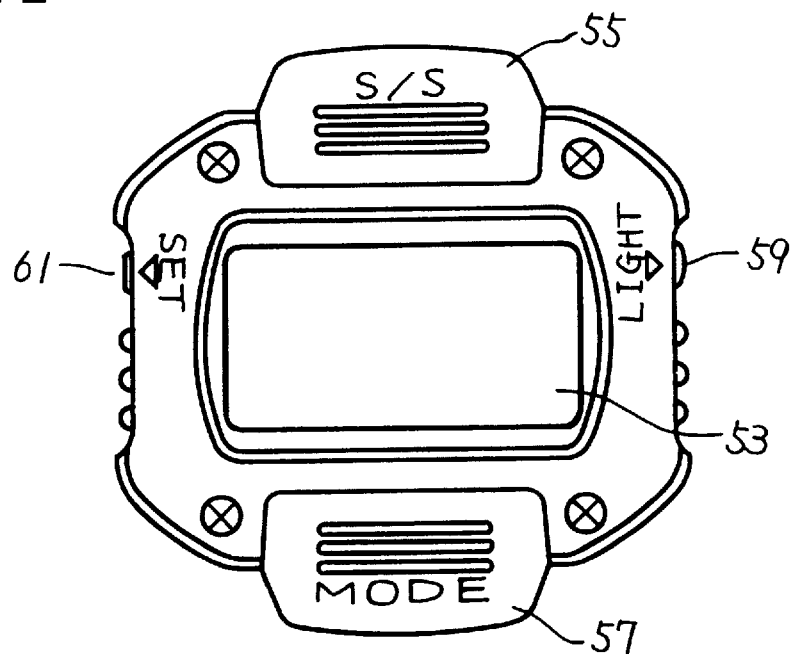
FIG. 2 is a front view of a computer having an altitude measuring function for a bicycle, employing the pressure sensor set in accordance with one embodiment of the present invention.
Figure 3:
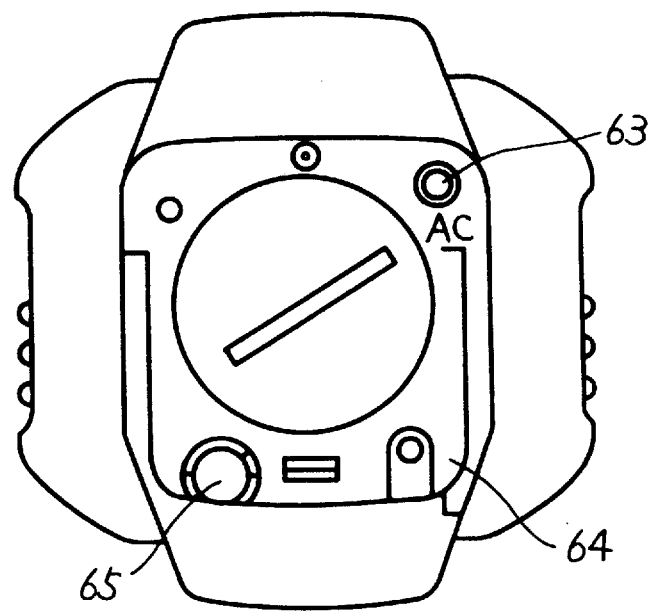
FIG. 3 is a rear view of the computer for a bicycle shown in FIG. 2.

Referring to FIGS. 2 and 3, a computer for a bicycle includes a liquid crystal display 53 for displaying altitude, pressure, temperature, speed or the like, a light button 59 for illuminating liquid crystal display 53, a set button 61 for setting data, a start/stop button 55 for starting and stopping measurement, a mode button 57 for switching measurement mode, and an AC (All Clear) button 63 for clearing memory. On a rear cover 64, there is provided a pressure sensor cap/filter 65 at a position corresponding to the pressure sensor contained therein, so as to prevent entrance of foreign matters to the pressure sensor.

Figure 1:
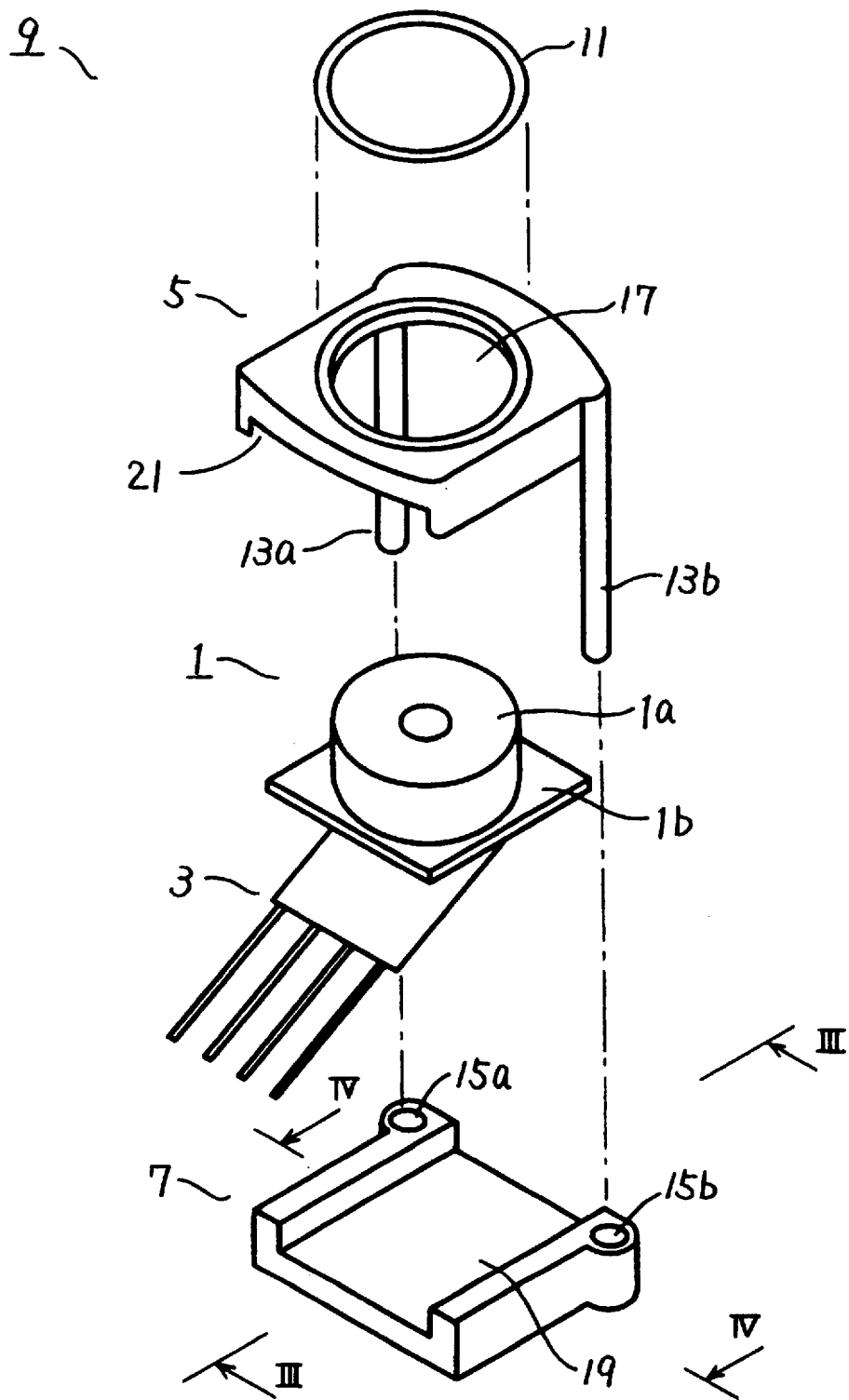
FIG. 1 is an exploded perspective view showing a pressure sensor set in accordance with one embodiment of the present invention.

FIG. 1 is an exploded perspective view showing the structure of a pressure sensor set (including the pressure sensor and parts for attaching the pressure sensor) contained in the computer for a bicycle shown in FIG. 2.

Referring to the FIG. 1, pressure sensor set 9 includes pressure sensor 1, a flat cable 3 for electrically connecting pressure sensor 1 to a substrate, which is an object of attachment, attachment parts 5 and 7 gripping pressure sensor 1 from both sides, and a sealing member 11 engaged with a sidewall of pressure sensor 1 for preventing entrance of water drop or the like into the computer for the bicycle. Pressure sensor 1 consists of a columnar portion 1a having a columnar shape and a plate portion 1b fixed at the bottom of columnar portion 1a.

Attachment part 5 has a sensor engaging hole 17 which engages with the columnar portion 1a of pressure sensor 1, and leg portions 13a and 13b engaging with receiving holes 15a and 15b of attachment part 7, respectively.

Attachment part 7 has receiving holes 15a and 15b through which leg portions 13a and 13b of attachment part 5 pass respectively, and has a recessed portion 19 on the side to be engaged with sensor 1, allowing movement of flat cable 3 therein.

Figure 4:
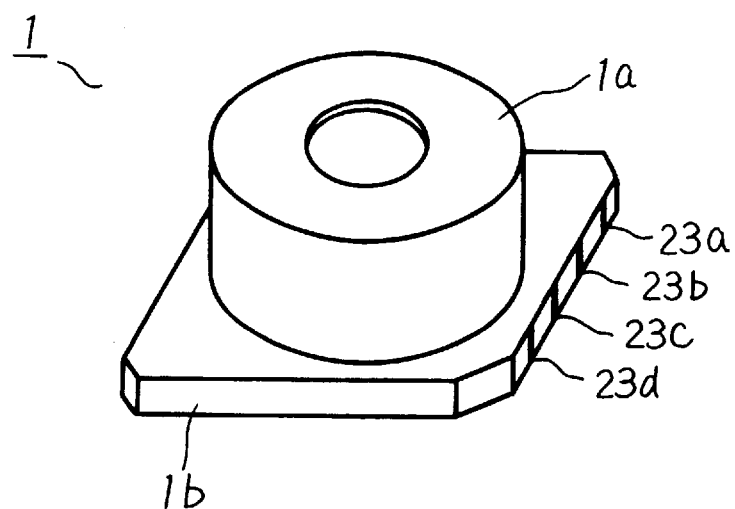
FIG. 4 shows an appearance of pressure sensor 1 shown in FIG. 1 from the side engaging with a flat cable 3.

FIG. 4 shows pressure sensor 1 of FIG. 1 viewed from the side to be engaged with flat cable 3.

Referring to the FIG. 4, at a side of plate portion 1b of pressure sensor 1, there are terminals 23a to 23d for inputting/outputting signals to and from sensor 1.

Figure 5:
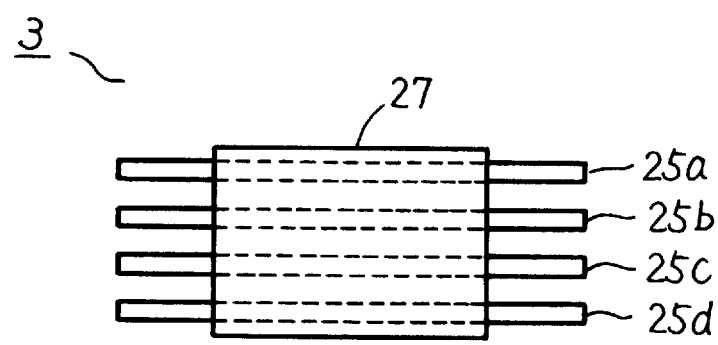
FIG. 5 is a plan view of the flat cable 3 shown in FIG. 1.

FIG. 5 is a plan view of flat cable 3 shown in FIG. 1.

Referring to the FIG. 1, flat cable 3 includes four leads 25a to 25d arranged parallel to each other, and a lead fixing member 27 for fixing respective leads such that leads 25a to 25d are integrated. When flat cable 3 is attached to pressure sensor 1, leads 25a to 25d of flat cable 3 are connected each at one end to terminals 23a to 23d of pressure sensor 1, respectively, by soldering.

Figure 6:
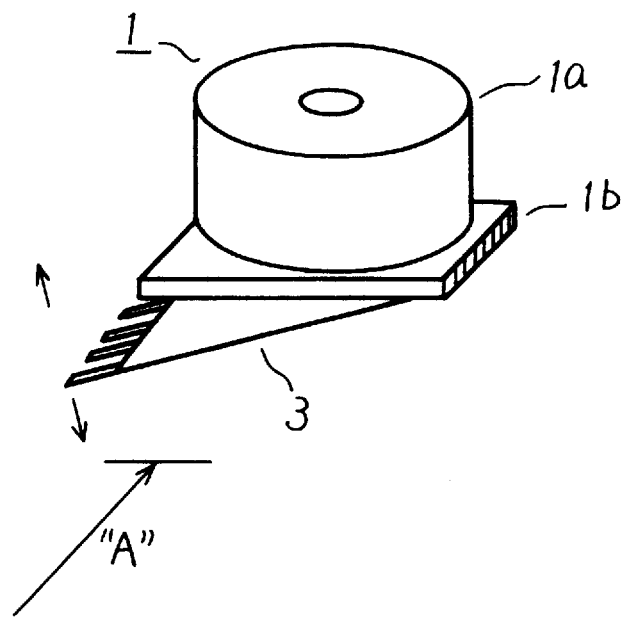
FIG. 6 is a perspective view showing flat cable 3 attached to pressure sensor 1.
Figure 7:
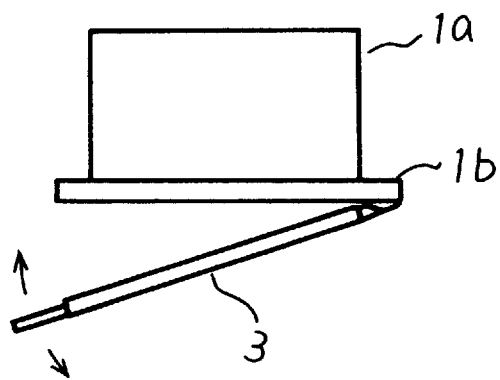
FIG. 7 shows an appearance of pressure sensor 1 of FIG. 6 viewed from the direction "A".

FIG. 6 is a perspective view showing flat cable 3 attached to pressure sensor 1, and FIG. 7 shows appearance of sensor 1 and flat cable 3 of FIG. 6 viewed from the direction of "A".

Flat cable 3 is connected swingable to pressure sensor 1. That is, it is swingable as flat cable 3 itself deforms and pivots with a portion connected by soldering to pressure sensor 1 serving as a fulcrum.

Figure 8:
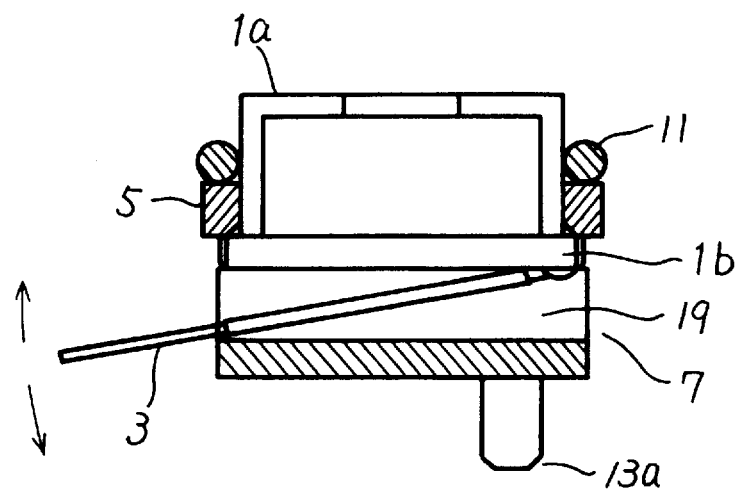
FIG. 8 is a cross sectional view taken along the line III—III with all the parts shown in FIG. 1 engaged.
Figure 9:
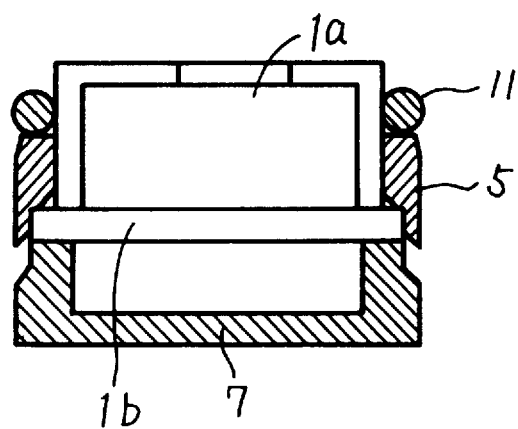
FIG. 9 is a cross section taken along the line IV—IV with all the-parts of FIG. 1 engaged.

FIG. 8 is a cross sectional view taken along the line III—III with all the parts shown in FIG. 1 engaged, and FIG. 9 is a cross section taken along the line IV—IV.

Referring to FIG. 9, pressure sensor 1 is fixed within attachment parts 5 and 7, as the plate portion 1b of pressure sensor 1 is gripped between attachment parts 5 and 7. Referring to FIG. 8, with attachment parts 5 and 7 engaged, flat cable 3 is movable within the range defined by the recessed portion 19 of attachment part 7. Leg portion 13a and leg portion 13b, not shown, protrude from attachment part 7 through receiving holes 15a, 15b.

Figure 10:
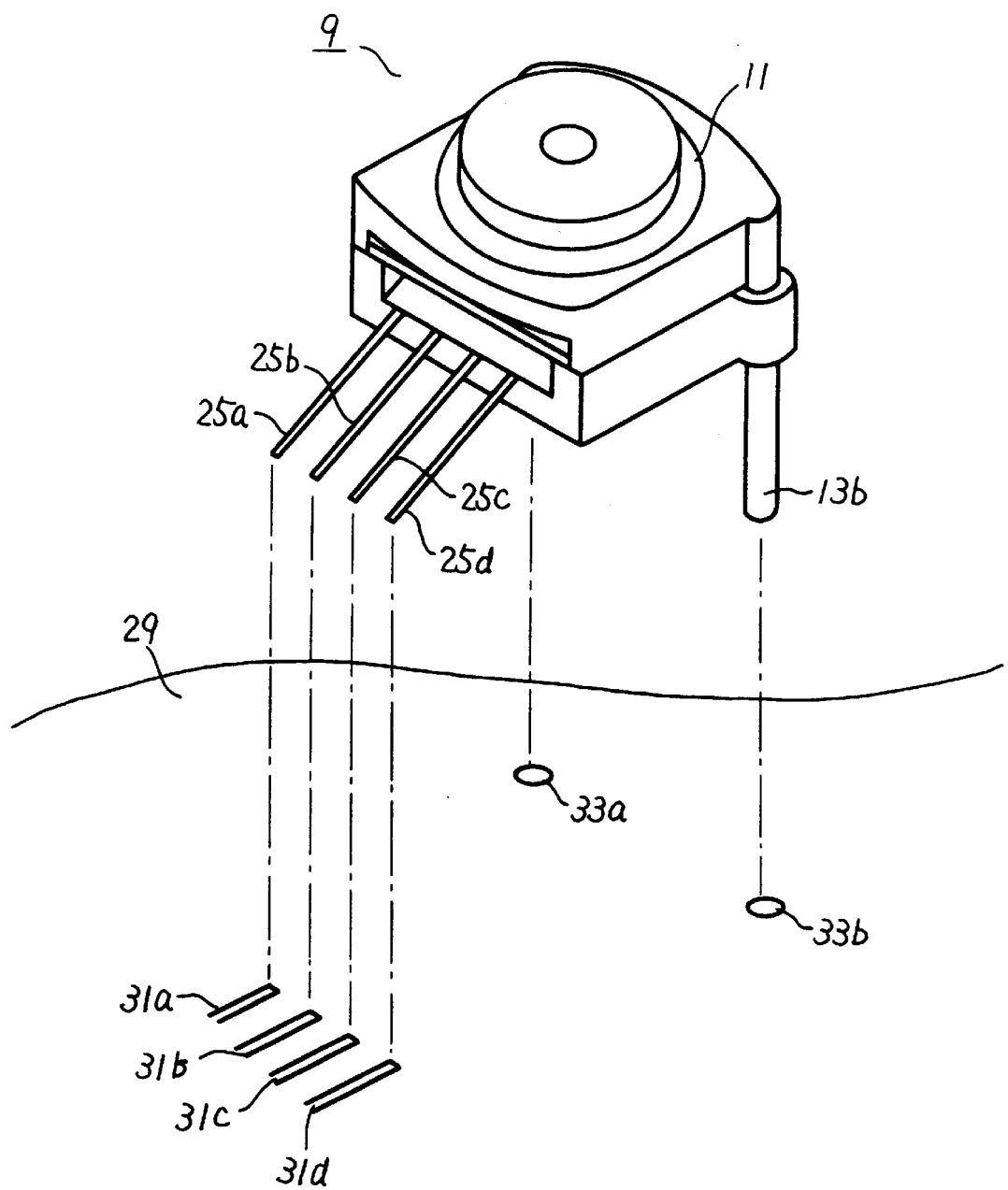
FIG. 10 is a perspective view showing how pressure sensor set 9 is attached to substrate 29.

FIG. 10 shows the manner how pressure sensor set 9 in accordance with the present embodiment is attached to substrate 29.

Referring to the FIG. 10, substrate 29 has receiving holes 33a and 33b provided at positions opposing to leg portions 13a and 13b, not shown, of pressure sensor set 9, respectively, and print patterns 31a to 31b provided at positions opposing to leads 25a to 25d of pressure sensor set 9, respectively. Receiving holes 33a and 33b have slightly larger diameters than that of leg portions 13a and 13b.

During the process of attaching the part, leg portions 13a and 13b of pressure sensor set 9 are inserted through receiving holes 33a and 33b of substrate 29, and in this state leads 25a to 25d are soldered to print patterns 31a to 31d respectively.

Figure 11:
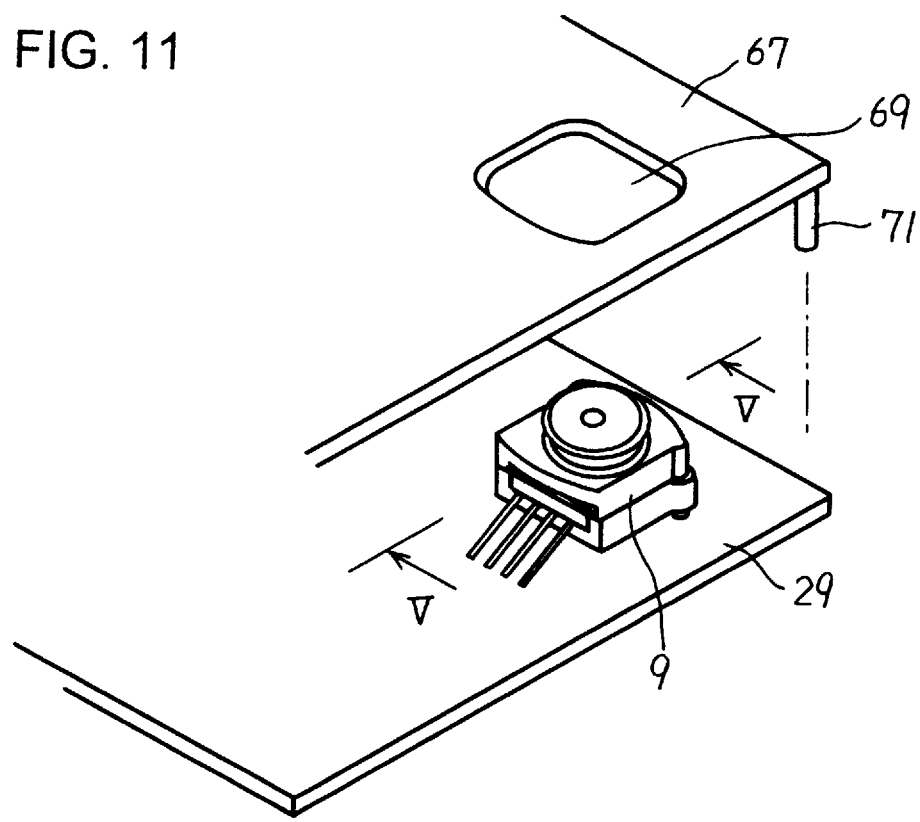
FIG. 11 is an exploded perspective view showing how panel 67 is attached to substrate 29 on which pressure sensor set 9 has been attached.

A panel 67 having a plate shape, covering substrate 29 as shown in FIG. 11 is attached to substrate 29 to which pressure sensor set 9 has been connected. Panel 67 is provided with a hole 69 through which the upper portion of pressure sensor set 9 protrudes from the panel 67. Further, panel 67 has a spacer 71 integrally formed with panel 67, for maintaining constant distance between substrate 29 and panel 67 so as to keep the length of protrusion of pressure sensor set 9 from the hole 69 of panel 67 constant.

Figure 12:
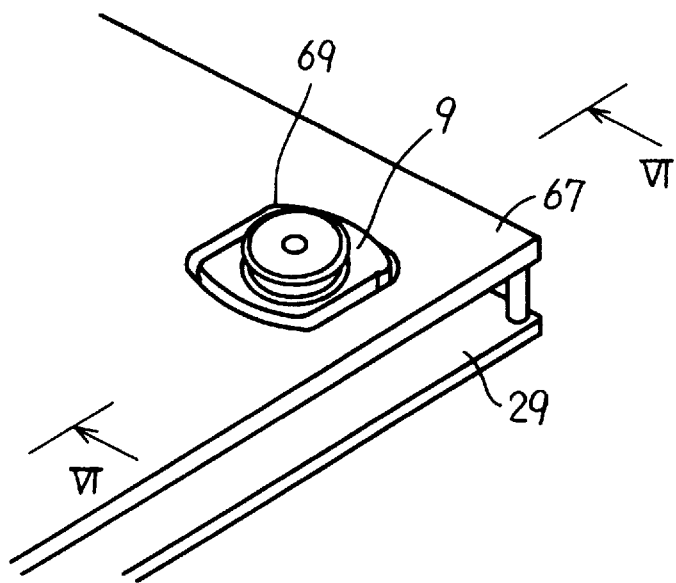
FIG. 12 is a perspective view showing substrate 29 and panel 67 of FIG. 11 engaged in a stacked state.

Referring to FIG. 11, when substrate 29 and panel 67 are engaged, a portion of pressure sensor set 9 protrudes from the hole 69 of panel 67 as shown in FIG. 12.

Figure 13A:
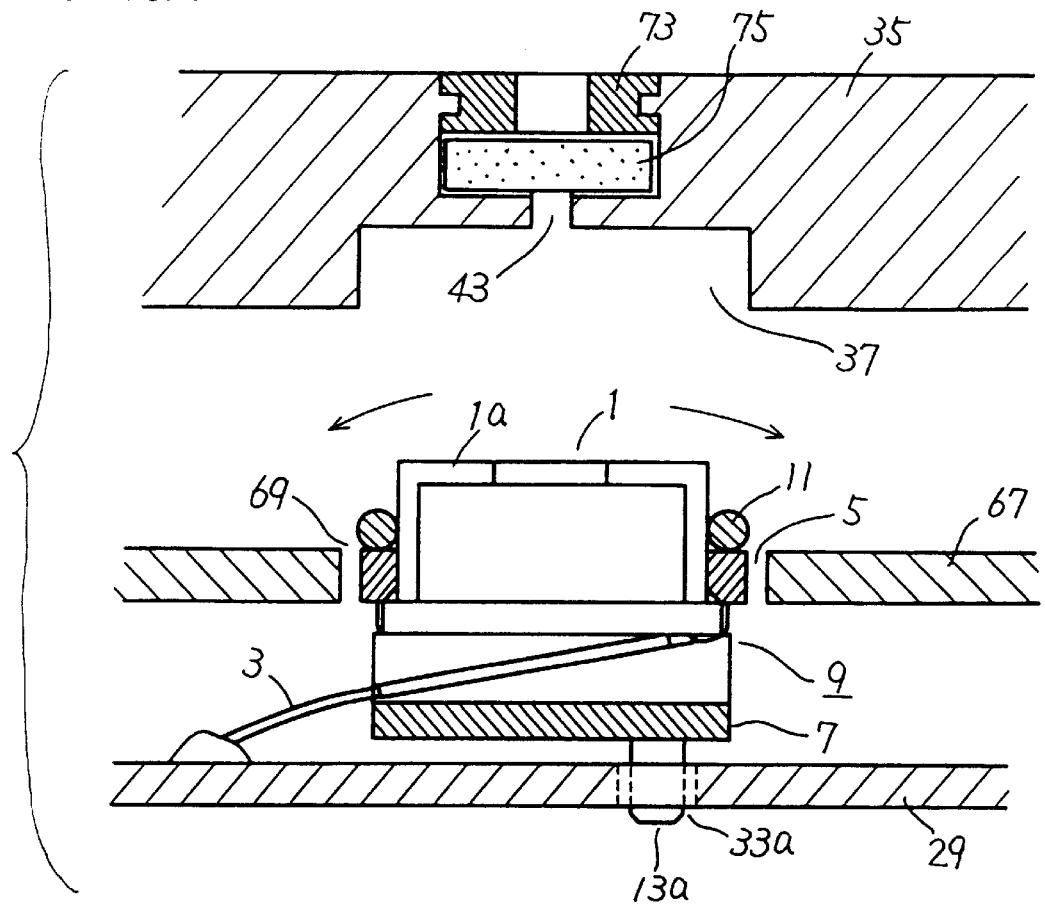
FIGS. 13A and 13B are cross sections showing how a cover 35 is attached on panel 67 in the state of FIG. 12.
Figure 13B:
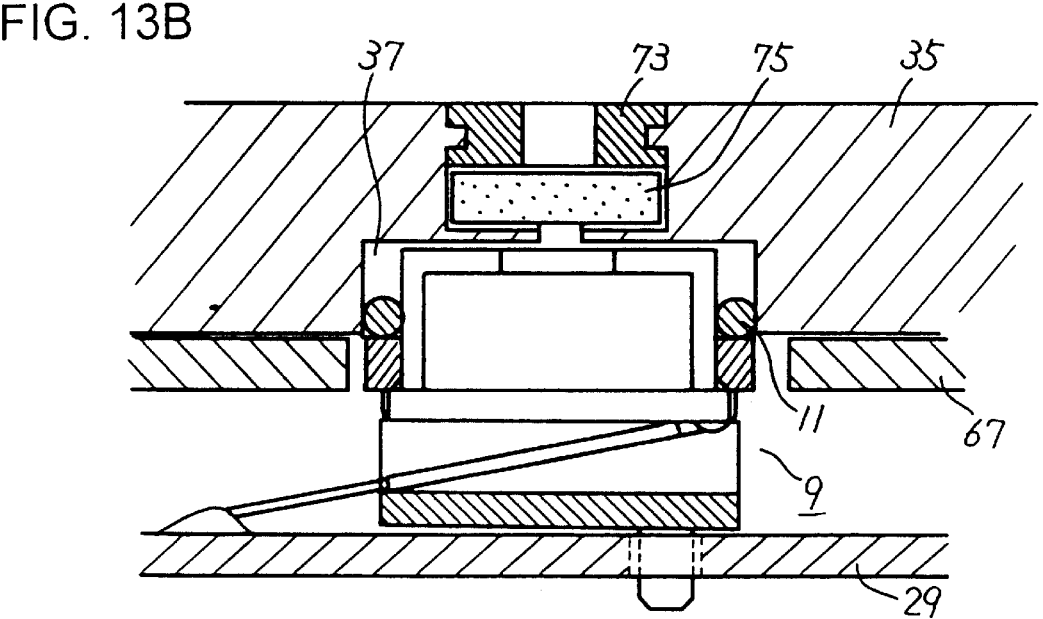
Figure 14:
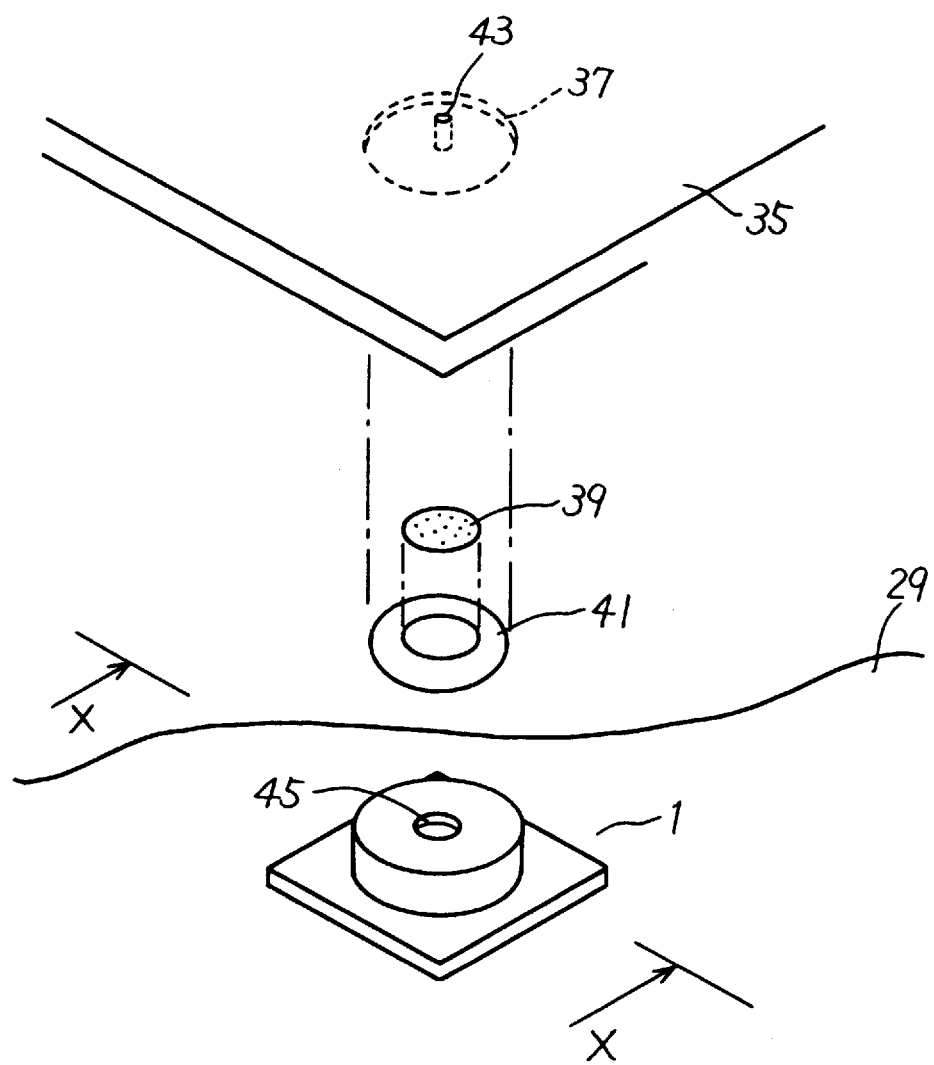
FIG. 14 is an exploded perspective view showing how the pressure sensor is attached in accordance with a conventional method.
Figure 15:
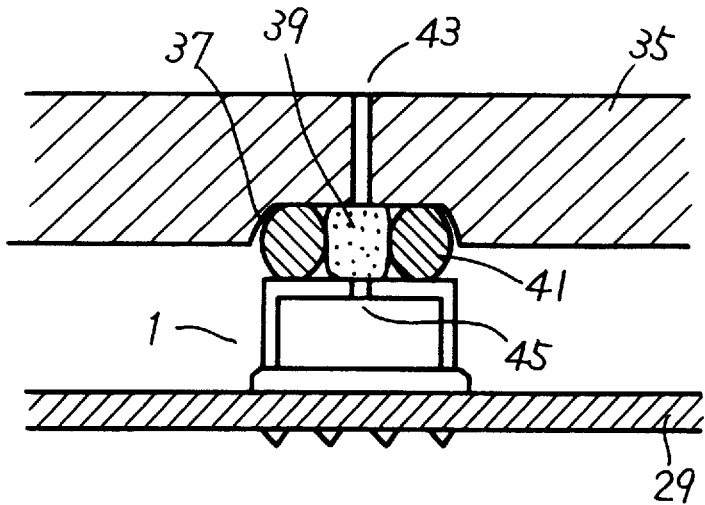
FIG. 15 is a cross section taken along the line X—X with all the parts shown in FIG. 14 engaged.
Figure 16:
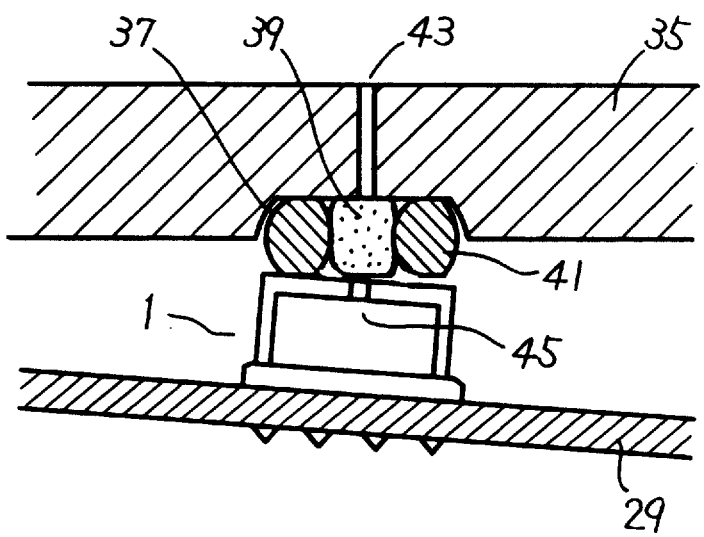
FIG. 16 is an illustration showing problems experienced in the conventional method of attaching the pressure sensor.

FIGS. 13A and 13B are cross sections taken along the line VI—VI showing how cover 35 is attached to the upper portion of panel 67 in a stacked manner shown in FIG. 12.

Referring to FIGS. 13A and 13B, cover 35 has a recessed portion 37 to be engaged with columnar portion 1a of pressure sensor set 9, and an air inlet 43 for introducing air positioned at the bottom portion of recessed portion 37. Further, cover 35 is provided with a filter 75 for preventing entrance of foreign matter from the outside, and a cap 73 for fixing filter 75.

The state in which cover 35 and pressure sensor set 9 are not in pressure contact (FIG. 13A), pressure sensor set 9 is connected swingably to substrate 29 by means of flat cable 3. As leg portion 13a and leg portion 13b not shown are inserted to receiving hole 33a and receiving hole 33b not shown, respectively, approximate position of pressure sensor set 9 is determined. However, as receiving holes 33a and 33b have diameters relatively larger than the diameters of leg portions 13a and 13b, pressure sensor set 9 can move to some extent in the horizontal direction with respect to substrate 29. However, the range of movement is limited within the hole 69 of panel 67. As pressure sensor set 9 moves, columnar portion 1a of pressure sensor 1 can be engaged with recessed portion 37 provided that recessed portion 37 of cover 35 and pressure sensor 1 are roughly aligned in position when cover 35 is attached. Therefore, one who attaches cover 35 can attach pressure sensor set 9 and cover 35 at appropriate positions without the necessity to pay meticulous attention to the positional relation between cover 35 and substrate 29.

As pressure sensor set 9 is connected swingable to substrate 29, even if substrate 29 vibrates, the vibration is not directly transmitted to pressure sensor set 9. Therefore, damage to the pressure sensor caused by vibration can be prevented.

When cover 35 is fully attached to panel 67, pressure sensor set 9 is fit in the recessed portion 37 of cover 35 as shown in FIG. 13B, and cover 35, pressure sensor set 9 and substrate 29 are brought into pressure contact with each other. Therefore, pressure sensor set 9 is fixed between substrate 29 and cover 35.

In this state, sealing member 11 is gripped between the sidewall of columnar portion 1a of pressure sensor 1 and the sidewall of recessed portion 37 of cover 35 in pressure sensor set 9. Therefore, entrance of air introduced through the air inlet to the inside of the device can be prevented.

Further, even when there is generated a small gap between cover 35 and substrate 29 by some shock, for example, it can be absorbed by deformation of flat cable 3, and hence pressure sensor set 9 never falls out from recessed portion 37.

In the present embodiment, two leg portions 13a and 13b are provided protruding from attachment part 5, which leg portions are inserted to receiving holes 33a and 33b provided on substrate 29. However, leg portions may not be provided so long as appropriate range of swing of pressure sensor 1 is ensured.

Though a pressure sensor has been described as an example of a component to be attached in the present embodiment, the present invention is applicable to any component.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Equipment for attaching an attachment part having a pressure sensor to a first object of attachment including a substrate such that the attachment part is fitted in a recessed portion of a second object of attachment, comprising:

first connecting means for electrically connecting said attachment part and said first object of attachment, said attachment part having a leg portion extending therefrom, said first object of attachment having a hole therein, the inside diameter of said hole being larger than the outside dimension of said leg portion;

second connecting means for connecting said attachment part and said first object of attachment to be relatively moveable laterally with respect to one another; and restricting means for restricting the range of said movement, whereby assembly of the equipment is facilitated by the relative movement between the leg portion and the hole in the first object of attachment and the relative movement between the attachment part and the first object of attachment.

2. The equipment according to claim 1, further comprising sealing member provided between said attachment part and said recessed portion.

3. The equipment according to claim 1, wherein said first connecting means includes a flat cable.

4. A computer for a bicycle provided with the equipment recited in claim 1.

5. A pressure sensor connected to a substrate by a cover, said pressure sensor having a leg portion, said substrate having a hole therein adapted to receive therein said leg portion, the inside diameter of said hole being larger than the outside dimension of said leg portion, said cover having a recessed portion for engaging the pressure sensor to retain same between said cover and said substrate, said pressure sensor further comprising;

measuring means for measuring pressure;

a cable for electrically connecting said measuring means to said substrate; said cable providing a swingable connection of the pressure sensor to the substrate during assembly; and restricting means between the cover and the substrate for restricting the position of said measuring means within a prescribed range, said restricting means comprising a panel having a hole that is larger than the outside dimension of the pressure sensor so as to permit lateral movement of the pressure sensor within said hole in the panel, the swingable connection of the pressure sensor relative to the substrate and the cooperation of the leg portion with the inside of the hole in the substrate facilitating assembly.

6. A computer for a bicycle provided with the pressure sensor recited in claim 5.

7. Equipment for attaching an attachment part having a functional element to a first object of attachment such that the attachment part is fitted in a recessed portion of a second object of attachment, comprising:

first connecting means for electrically connecting said attachment part and said first object of attachment; said attachment part having a leg portion extending therefrom, said first object of attachment having a hole therein, the inside diameter of said hole being larger than the outside dimension of said leg portion, second connecting means for connecting said attachment part and said first object of attachment to be relatively moveable laterally with respect to one another;

said attachment part including a pressure sensor and said first object of attachment including a substrate, said pressure sensor including measuring means for measuring pressure, said first connecting means comprising a cable for electrically connecting said measuring means to said substrate, said cable providing a swingable connection of the pressure sensor to the substrate during assembly of the equipment; and restricting means for restricting the position of said measuring means within a prescribed range, said restricting means comprising a hole in the second connecting means that is larger than the outside dimension of the pressure sensor so as to permit lateral movement of the pressure sensor within said hole in the second connecting means, the swingable connection of the pressure sensor relative to the substrate and the cooperation of the leg portion with the inside of the hole in the first object of attachment facilitating assembly of the equipment.

8. A pressure sensor connected to a substrate by a cover, said pressure sensor having a leg portion, said substrate having a hole therein adapted to receive said leg portion, the inside diameter of said hole being larger than the outside dimension of said leg portion, said cover having a recessed portion for engaging the pressure sensor to retain same between said cover and said substrate, a cable for electrically connecting said pressure sensor to said substrate, said cable providing a swingable connection of the pressure sensor to the substrate during assembly, a panel between the cover and the substrate having a hole therein that is larger than the outside dimension of the pressure sensor so as to permit lateral movement of the pressure sensor within said hole in the panel, and a sealing member between the pressure sensor and the recessed portion of the cover, whereby assembly of the pressure sensor between the cover and the substrate is facilitated by the relative movement between the leg portion and the hole in the substrate and the relative movement between the pressure sensor and the hole in the panel, and the pressure sensor is fixed between the substrate and the cover.

* * * * *